Dec. 29, 1970  J. A. CORDELL  3,551,008
ADAPTER FOR AIR CONDITIONING DUCT
Filed Oct. 17, 1966
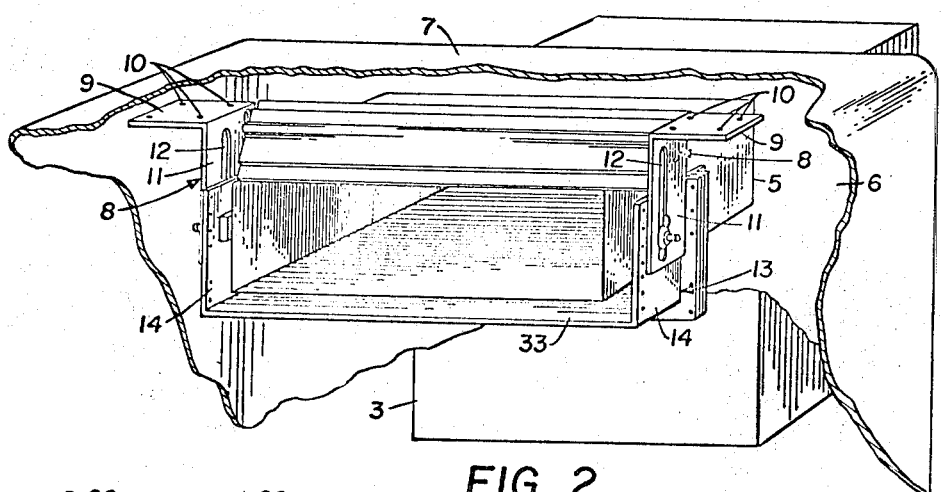
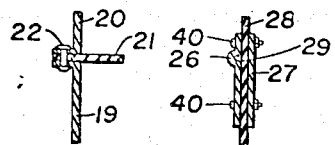
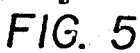
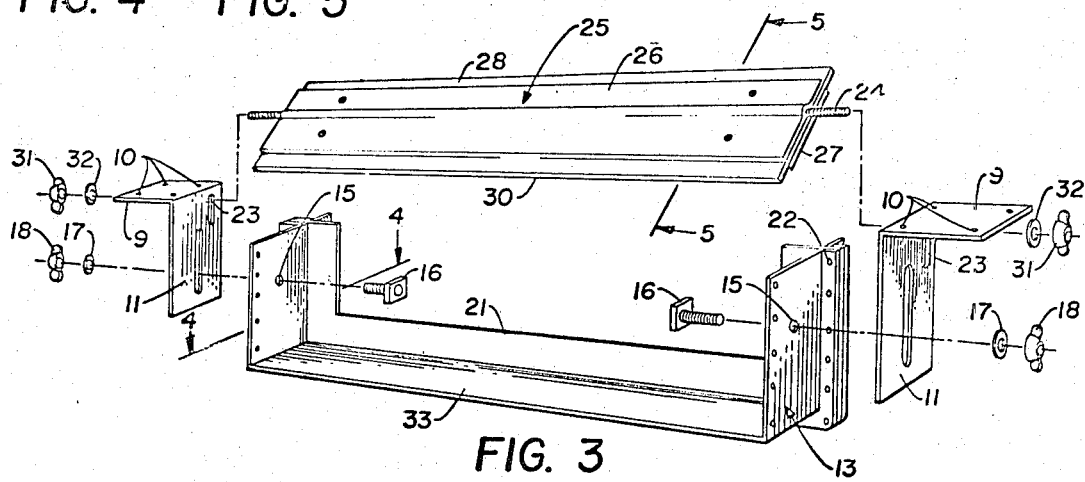
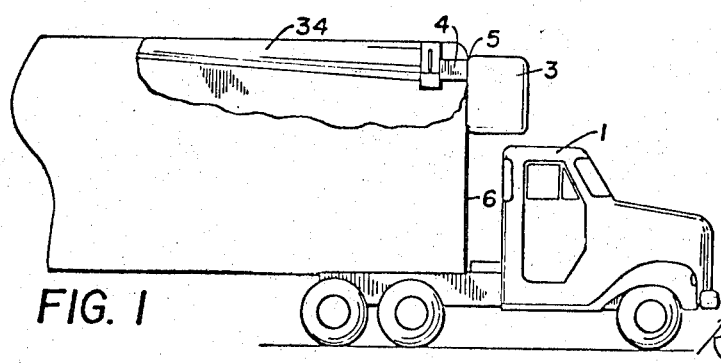
INVENTOR
JAMES A. CORDELL
ATTORNEY United States Patent Office 3,551,008
Patented Dec. 29, 1970

3,551,008
ADAPTER FOR AIR CONDITIONING DUCT
James A. Cordell, 2504 Collingwood,
Dallas, Tex. 75234
Filed Oct. 17, 1966, Ser. No. 587,152
Int. Cl. F16l 25/00
U.S. Cl. 285—177                             6 Claims

ABSTRACT OF THE DISCLOSURE

An adapter for facilitating the installation and removal of refrigeration units such as those commonly mounted on the forward wall of trailers used in transporting fungible items. The adapter includes a U-shaped frame having a resilient sealing element protruding interiorly therefrom to sealingly engage a portion of the periphery of the outlet duct of the refrigeration unit which serves to comminute cold air from the refrigeration unit into the trailer through an opening in the forward wall of the trailer. Bracket means are provided for adjustably mounting the U-shaped frame to a suitable supporting member, such as the roof of the trailer. The bracket means also supports a pivotally mounted baffle which is positioned above the frame so as to define therewith a rectangular opening through which the outlet duct may be inserted. The size of the opening may be adjusted by pivotal movement of the baffle thus permitting the accommodation of different size outlet ducts, as well as facilitating easy removal and installation of the refrigeration unit.

---

This invention relates to an adapter which facilitates the installation and removal of a refrigeration unit having an outlet duct, and more particularly, but not by way of limitation, to an adapter for faciliating the installation and removal of a refrigeration unit on a tractor-trailer vehicle.

In the transportation of food products and the like, it is common to mount a refrigeration unit proximate the front of a trailer so that the outlet duct of the unit extends through the front wall of the trailer for distributing refrigerated air around the fungible items contained in the trailer. The problem to which the present invention is directed arises by reason of the fact that such refrigeration units sometimes become inoperative and require service. In most cases, when the refrigeration unit becomes inoperative, it is necessary to unload the contents of the trailer in order to remove the refrigeration unit.

The present invention may be generally described as an adjustable adapter for facilitating the installation and removal of a refrigeration unit having an outlet duct. The adapter comprises a U-shaped frame having opposed legs and provided with resilient seal means which protrude from the interior of the frame for defining a U-shaped resilient partition. Brackets are provided for adjustably mounting the frame to a supporting member. A baffle is pivotally mounted above the frame for defining an adjustable and substantially rectangular opening through which the outlet duct of a refrigeration unit may be inserted.

To be more particular, reference is made to the drawings, in which:

FIG. 1 is a partially cutaway elevation view of a tractor-trailer vehicle within the trailer of which is mounted one embodiment of the present invention;

FIG. 2 is a partially cutaway perspective view through the front end of the FIG. 1 trailer better illustrating the embodiment of the invention;

FIG. 3 is an exploded perspective view of the embodiment of the invention illustrated in FIGS. 1 and 2;

FIG. 4 is a section view taken along line 4—4 of FIGURE 3; and

FIG. 5 is a section view taken along line 5—5 of FIG. 3.

With reference to FIG. 1, a conventional tractor 1 and trailer 2 carry a refrigeration unit 3, the outlet duct 4 of whcih extends through an aperture 5 in front wall 6 of trailer 2. Mounted to ceiling 7 of trailer 2 are opposed L-shaped brackets 8, legs 9 of which are provided with a plurality of apertures 10 through which suitable securing means such as screws or rivets may be passed for fixing legs 9 to ceiling 7. Brackets 8 have depending legs 11 which are provided with elongate slots 12. Brackets 8 serve to support a U-shaped frame 13, legs 14 of which are provided with apertures 15. Apertures 15 register with slots 12 of bracket 8. As illustrated in FIG. 2, legs 14 of frame 13 pass interiorly of legs 11 of bracket 8 and can be adjustably fixed relative thereto. To permit relative adjustment of bracket 8 and frame 13, there are provided flat head screws 16 which pass through the registering portion of slots 12 and apertures 15 for receiving a washer 17 and wing nut 18 or the like.

Frame 13, as best seen in FIG. 4, is comprised of two sections 19 and 20 between which is sandwiched resilient seal member 21 of rubber, neoprene, or the like. Sections 19 and 20 are held in abutting relationship to sealing member 21 by rivets 22 distributed about the outer periphery of frame 13. Seal member 21 protrudes interiorly of frame 13 to form a U-shaped partition, as particularly illustrated in FIG. 3.

Brackets 8 are provided with aligned slots 23 which receive a threaded rod 24. Rod 24 passes through a baffle 25, which as particularly illustrated in FIG. 5 is formed by opposed plates 26 and 27 which retain therebetween by use of screws and nuts to a resilient member 28 of rubber, neoprene or the like. Plate 26 is embossed to form a recess 29 within which rod 24 is received. Brackets 8 support baffle 25 for rotation about a fixed axis along rod 24. Baffle 25 has a resilient edge or lip 30 which upon rotation of baffle 25 will describe an arcuate plane intersecting the space contained between legs 14 of frame 13. Baffle 25 cooperates with frame 13 in defining an adjustable, substantially rectangular opening within which outlet duct 4 of refrigeration unit 3 can be received. Once baffle 25 has been rotated to a desired position, it can be fixed relative to bracket 8 by tightening of wing nuts 31 which together with washers 32 are received by rod 24.

To install the embodiment of the invention illustrated in FIGS. 1-5, the brackets 8 are secured to ceiling 7 of trailer unit 2 at a distance from wall 6 sufficient to permit the end of outlet duct 4 to be received between legs 14 of frame 13. Frame 13 is mounted on brackets 8 so that the bottom 33 of frame 13 will be slightly below the lower lip of aperture 5 in wall 6. Frame 13 is adjustable relative to bracket 8, as described above, to permit installation of the adapter in trailers of various designs which may have the aperture 5 in wall 6 postioned at different distances from ceiling 7 of trailer 2. After installation of bracket 8 and frame 13, baffle 25 is rotated to define with partition 21 a substantially rectangular opening which from top to bottom is slightly smaller than the top to bottom dimension of the outlet duct 4 of refrigeration unit 3. Outlet duct 4 may then be inserted through opening 5 in wall 6 so that the leading edge of duct 4 passes over partition 21 and under leading edge 30 of baffle 25 slightly deforming them to assure a relatively tight seal. Because baffle 25 is rotatable relative to bracket 8 and frame 13, outlet ducts of different top to bottom dimensions may be accommodated by the adapter, and it is not necessary, if refrigeration unit 3 fails, to unload the contents of trailer 2 to remove the refrigeration unit 3. If refrigeration unit 3 is replaced with a different unit having outlet duct 4 of different dimensions, the individual installing the new unit may reach through aperture 5 in wall 6 and by manipulation of wing nuts 31 and baffle 25 adjust the opening through which duct 4 of the new unit will be inserted, thus permitting installation of new units without removing cargo from trailer 2. If necessary, the frame 13 may be lowered by manipulation of wing nuts 18, thus providing a unit with an opening which may be enlarged by adjustment of the baffle 25 on the frame 13.

If trailer 2 is provided with a distribution duct system 34 to assure distribution of cool air throughout the cargo, frame 13 is provided with a plurality of apertures 35 to which the distribution duct 34 may be attached by use of screws, rivets, or the like. As will be obvious, the attachment of a distribution duct 34 to the adapter does not alter the capability of the adapter to accommodate outlet ducts of varying dimension and the ease with which a refrigeration unit 3 may be installed and removed.

While rather specific terms have been used to describe one embodiment of the invention, they are not intended, nor should they be construed, as a limitation on the invention as defined by the claims.

What is claimed is:

1. An adjustable adapter for facilitating the installation and removal of refrigeration unit having an outlet duct, comprising:
   (a) a U-shaped frame having opposed legs;
   (b) resilient seal means protruding interiorly from said frame for defining a U-shaped resilient partition;
   (c) bracket means for adjustably mounting said frame to a supporting member; and
   (d) a baffle pivotally mounted in said bracket means and positioned above said frame for defining with said frame an adjustable substantially rectangular opening through which the outlet duct of a refrigeration unit may be inserted.

2. The device of claim 1, wherein:
said baffle is provided along at least one edge with a resilient lip adapted to sealingly engage the outlet duct of the refrigeration unit.

3. The device of claim 1, wherein:
the opposed legs of said U-shaped frame are provided with apertures,
said bracket means are provided with elongate slots which register with the apertures in said frame, and
means passing through said registering slots and apertures for permitting movement of said frame relative to said bracket and securing of said frame relative to said bracket.

4. The device of claim 3, wherein:
said baffle is pivotally mounted by said bracket means permitting movement of one edge of said baffle through an arcuate plane which intersects the space contained between the legs of said U-shaped frame.

5. The device of claim 1, wherein:
said baffle is pivotally mounted by said bracket means to permit movement of one edge of said baffle through an arcuate plane which intersects the space contained between the legs of said U-shaped frame.

6. The device of claim 1, including:
a distributing duct mounted proximate said frame for receiving the discharge from the outlet duct of said refrigeration unit.

References Cited
UNITED STATES PATENTS

| | | | |
|---|---|---|---|
| 766,453 | 8/1904 | Lutz | 285—177 |
| 2,667,372 | 1/1954 | Gardner | 285—177 |
| 3,100,384 | 8/1963 | Lowensohn | 165—17 |

LAVERNE D. GEIGER, Primary Examiner

R. I. SMITH, Assistant Examiner

U.S. Cl. X.R.

165—17